United States Patent
Mizuno

(10) Patent No.: US 8,352,539 B2
(45) Date of Patent: Jan. 8, 2013

(54) CONTENT DISTRIBUTING SYSTEM AND CONTENT RECEIVING AND REPRODUCING DEVICE

(75) Inventor: Nobuhiro Mizuno, Tokyo (JP)

(73) Assignee: Denso It Laboratory, Inc., Tokyo (JP)

( * ) Notice: Subject to any disclaimer, the term of this patent is extended or adjusted under 35 U.S.C. 154(b) by 624 days.

(21) Appl. No.: 11/885,471

(22) PCT Filed: Mar. 3, 2005

(86) PCT No.: PCT/JP2005/003638
§ 371 (c)(1),
(2), (4) Date: Aug. 31, 2007

(87) PCT Pub. No.: WO2006/092866
PCT Pub. Date: Sep. 8, 2006

(65) Prior Publication Data
US 2008/0250095 A1 Oct. 9, 2008

(51) Int. Cl.
*G06F 15/16* (2006.01)
*G06F 7/00* (2006.01)
(52) U.S. Cl. ........ 709/201; 709/203; 709/218; 709/226; 701/36; 701/465
(58) Field of Classification Search .................. 709/204, 709/206, 217–219, 203, 226, 231
See application file for complete search history.

(56) References Cited

U.S. PATENT DOCUMENTS 6,665,659 B1 * 12/2003 Logan .................................. 1/1
6,847,885 B2 * 1/2005 Sato et al. ..................... 701/465
2001/0051905 A1 * 12/2001 Lucas ............................. 705/29
2002/0029384 A1 * 3/2002 Griggs ............................ 725/46
2002/0091848 A1 * 7/2002 Agresta et al. ................ 709/231

(Continued)

FOREIGN PATENT DOCUMENTS

JP 08-336099 12/1996

(Continued)

OTHER PUBLICATIONS

Tom Bunzel, "Easy Digital Music," Que Publishing, Aug. 18, 2004, p. 62.*

*Primary Examiner* — Linglan Edwards
(74) *Attorney, Agent, or Firm* — Louis Woo

(57) ABSTRACT

A technology that makes a program line-up related to contents distributed to a user side, depending on various conditions, preferences, and communication environments of the user side that views and listens to the content is disclosed. According to the technology, an on-board device (content receiving and reproducing device) 1 receives, from a service server 5, potential content list information of contents that can be distributed from a content server 7. The on-board device 1 sorts appropriate content from among the contents in the potential content list information and decide on a reproducing order of the contents, based on conditions of the user side, such as user preferences and vehicle conditions, conditions related to an environment on the user side, such as the communication environment, and conditions related to the contents, such as the genre of the content. The on-board device 1 creates program table information (timetable) and transmits the program table information to the content server. As a result, reception and reproduction of the contents from the content server can be performed in adherence to the program table information.

1 Claim, 5 Drawing Sheets

U.S. PATENT DOCUMENTS

| | | | |
|---|---|---|---|
| 2003/0005074 A1* | 1/2003 | Herz et al. | 709/216 |
| 2003/0036824 A1* | 2/2003 | Kuroda et al. | 701/1 |
| 2003/0065503 A1* | 4/2003 | Agnihotri et al. | 704/7 |
| 2003/0114968 A1* | 6/2003 | Sato et al. | 701/36 |
| 2003/0217328 A1* | 11/2003 | Agassi et al. | 715/500 |
| 2005/0201376 A1* | 9/2005 | Iizuka et al. | 370/392 |

FOREIGN PATENT DOCUMENTS

| | | |
|---|---|---|
| JP | 09-261616 | 10/1997 |
| JP | 2001265787 A * | 9/2001 |
| JP | 2001-292437 | 10/2001 |
| JP | 2002-112186 | 4/2002 |
| JP | 2002117031 A * | 4/2002 |
| JP | 2003-030087 | 1/2003 |
| JP | 2004078640 A * | 3/2004 |
| JP | 2004078820 A * | 3/2004 |

* cited by examiner

CONTENT DISTRIBUTING SYSTEM AND CONTENT RECEIVING AND REPRODUCING DEVICE

TECHNICAL FIELD

The present invention relates to an improvement in a content distributing service that can distribute content to a user, depending on user preference.

BACKGROUND ART

Conventionally, a mobile communication terminal that can be carried, such as a mobile phone, a personal handy-phone system (PHS) terminal, and a personal digital assistant (PDA), and a communication device installed in a mobile object, such as a vehicle, a ship, and an airplane, can receive content such as music data and video data, via wireless communication, and replay the received content. For example, a wireless communication system that enables a user to enjoy audio outputted from a speaker by receiving and reproducing radio broadcast waves and a wireless communication system that can receive and reproduce digital content such as video data and music data from a predetermined server, via a digital communication network and the like, are known.

However, a content distributing system for radio broadcasts and other broadcasting formats provides an unspecified number of users with the same program (content). There is a problem in that the user is not always able to enjoy the content the user wishes to view and hear. To solve problems such as this, many content distributing systems are known that can perform on-demand-type content distribution taking into consideration user preferences.

For example, in Patent Document 1, below, a content distribution network system is disclosed that monitors a content preference state of a user and stores content highly preferred by the user in a content storing unit disposed in a location closest to a user terminal in a network configuration.

Patent Document 1: Japanese Patent Application Publication No. 2003-30087 (Paragraph 0018 to Paragraph 0024 and FIG. 2)

However, in a conventional content distributing system, there is a problem in that the user is not necessarily able to view and listen to a desired content when the user wishes. In addition, although the content is distributed depending on user preferences, there is a problem in which, when only the user preferences are taken into consideration, the same or similar contents may be distributed all the time.

In addition, the content distribution is performed without taking into consideration the time at which the user can view and listen to the content. For example, when the user is viewing and listening to the content on an on-board content receiving and reproducing device, there is a problem in that the user reaches a destination during the content distribution and is forced to stop viewing and listening to the content halfway. Furthermore, there is a problem in that the user cannot receive the content in a location with a poor communication environment. As a result, the content is cut off and the content distribution cannot be performed.

DISCLOSURE OF THE INVENTION

The present invention has been achieved to solve the above-described problems. An object of the present invention is to provide a content distributing system and a content receiving and reproducing device that can configure a program line-up of contents to be distributed to a user side, depending on various conditions, preferences, and communication environments of the user side that will view and listen to the contents.

In order to achieve the object, according to the present invention, a content distributing system is provided in which a content server, a service server, and a content receiving and reproducing device on a user side are connected by a network. The content server distributes contents. The service server has potential content list information including identification information of the contents that can be distributed from the content server. The content receiving and reproducing device receives the contents from the content server and reproduces the received contents. The content receiving and reproducing device receives the potential content list information indicating the contents that can be distributed from the content server to the content receiving and reproducing device from the service server. The content receiving and reproducing device sorts the contents to be received and reproduced from the contents written in the received potential content list information and decides on a reproducing order of the contents, based on at least one of conditions of the user side, conditions related to an environment on the user side, and conditions related to the contents. The content receiving and reproducing device creates program table information and transmits the program table information to the service server. The service server gives an instruction for content distribution to the content server, based on the program table information received from the content receiving and reproducing device. As a result, the content server distributes the contents directly or via the service server to the content receiving and reproducing device. The content receiving and reproducing device receives and reproduces the contents in adherence to the program table information.

In order to achieve the object, according to the present invention, a content distributing system is provided in which a content server, a service server, and a content receiving and reproducing device on a user side are connected by a network. The content server distributes contents. The service server has potential content list information including identification information of the contents that can be distributed from the content server. The content receiving and reproducing device receives the contents from the content server and reproduces the received contents. The content receiving and reproducing device receives the potential content list information indicating the contents that can be distributed from the content server to the content receiving and reproducing device from the service server. The content receiving and reproducing device sorts the contents to be received and reproduced from the contents written in the received potential content list information and decides on a reproducing order of the contents, based on at least one of conditions of the user side, conditions related to an environment on the user side, and conditions related to the contents. The content receiving and reproducing device creates program table information and transmits the program table information to the content server. The content server distributes the contents to the content receiving and reproducing device in adherence to the program table information. The content receiving and reproducing device receives and reproduces the contents in adherence to the program table information.

In order to achieve the object, according to the present invention, a content distributing system is provided in which a content server, a service server, and a content receiving and reproducing device on a user side are connected by a network. The content server distributes contents. The service server performs management related to the distribution of the contents. The content receiving and reproducing device holds, in advance, potential content list information indicating the contents that can be distributed by the content server, receives the contents from the content server, and reproduces the received contents. The content receiving and reproducing device sorts the contents to be received and reproduced from the contents written in the received potential content list information and decides on a reproducing order of the contents, based on at least one of conditions of the user side, conditions related to an environment on the user side, and conditions related to the contents. The content receiving and reproducing device creates program table information and transmits the program table information to the service server. The service server gives an instruction for content distribution to the content server, based on the program table information received from the content receiving and reproducing device. As a result, the content server distributes the contents directly or via the service server to the content receiving and reproducing device. The content receiving and reproducing device receives and reproduces the contents in adherence to the program table information.

In order to achieve the object, according to the present invention, a content distributing system is provided in which a content server and a content receiving and reproducing device on a user side are connected by a network. The content server distributes contents. The content receiving and reproducing device holds, in advance, potential content list information indicating the contents that can be distributed by the content server, receives the contents from the content server, and reproduces the received contents. The content receiving and reproducing device sorts the contents to be received and reproduced from the contents written in the received potential content list information and decides on a reproducing order of the contents, based on at least one of conditions of the user side, conditions related to an environment on the user side, and conditions related to the contents. In addition, the content receiving and reproducing device creates program table information and transmits the program table information to the content server. The content server distributes the contents to the content receiving and reproducing device in adherence to the program table information. The content receiving and reproducing device receives and reproduces the contents in adherence to the program table information.

In order to achieve the object, according to the present invention, a content receiving and reproducing device of a user side that receives content from a content distribution side and reproduces the received content is provided. The content receiving and reproducing device includes a potential content list information receiving means, a program line-up means, a program table information transmitting means, a content receiving means, and a content reproducing means. The potential content list information receiving means receives potential content list information from the content distribution side that indicates contents that can be distributed from the content distribution side. The program line-up means sorts the contents to be received and reproduced from the contents written in the received potential content list information and decides on a reproducing order of the contents, based on at least one of conditions of the user side, conditions related to an environment on the user side, and conditions related to the contents. In addition, the program line-up means creates program table information. The program table information transmitting means transmits the program table information created by the program line-up means to the content distribution side. The content receiving means receives the contents distributed from the content distribution side in adherence to the program table information. The content reproducing means reproduces the contents.

In order to achieve the object, according to the present invention, a content receiving and reproducing device of a user side that receives content from a content distribution side and reproduces the received content is provided. The content receiving and reproducing device includes a potential content list information storing means, a program line-up means, a program table information transmitting means, a content receiving means, and a content reproducing means. The potential content list information storing means stores, in advance, potential content list information that indicates contents that can be distributed from the content distribution side. The program line-up means sorts the contents to be received and reproduced from the contents written in the potential content list information stored in the potential content list information storing means and decides on a reproducing order of the contents, based on at least one of conditions of the user side, conditions related to an environment on the user side, and conditions related to the contents. In addition, the program line-up means creates program table information. The program table information transmitting means transmits the program table information created by the program line-up means to the content distribution side. The content receiving means receives the contents distributed from the content distribution side in adherence to the program table information. The content reproducing means reproduces the contents.

In the present invention, the content distributing system and the content receiving and reproducing device having the above-described configurations are provided. As a result, advantageous effects can be achieved in that a program line-up related to contents distributed to the user side can be made depending on various conditions, preferences, communication environments, and the like of the user side that views and listens to the contents.

BEST MODE FOR CARRYING OUT THE INVENTION

Hereinafter, an embodiment of the present invention will be described with reference to the drawings. Hereafter, when an on-board device 1 that is installed in a vehicle has a content receiving and reproducing function, and a user side operates the on-board device 1, receives content, such as audio data and text data, and listens to the audio data is described. In other words, the on-board device 1 described herein can be called a personalized radio that can receive a radio broadcast based on program table information (time table) set taking into consideration various conditions of the user side.

The present invention is not limited to this embodiment. For example, a content receiving and reproducing device can be provided that is separate from the on-board device 1. In addition, a personal computer (PC), a mobile terminal, and the like can include the content receiving and reproducing function.

Figure 1:
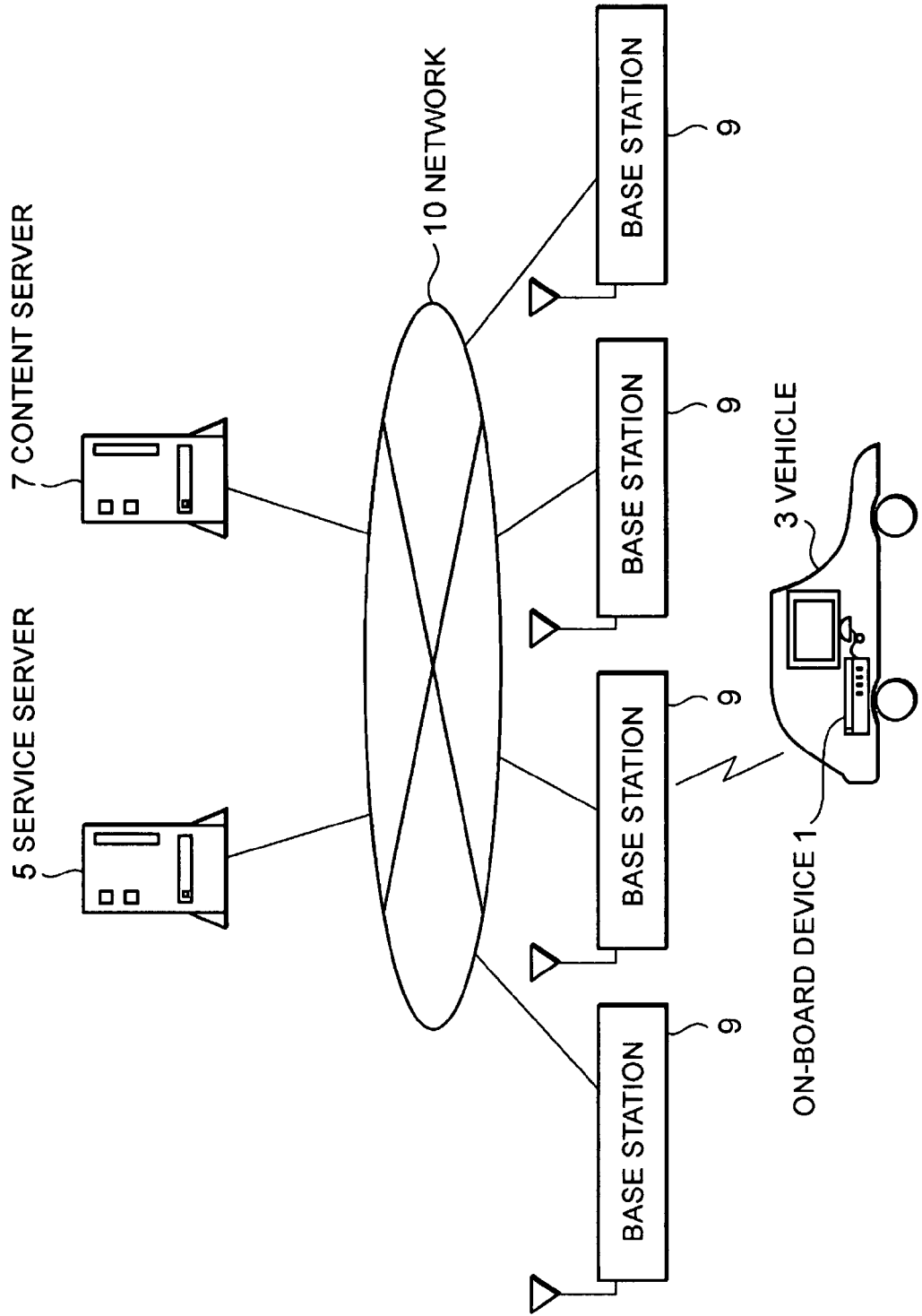
FIG. 1 is a schematic diagram of a configuration of a content distributing system according to an embodiment of the present invention.

FIG. 1 is a schematic diagram of a configuration of a content distributing system according to the embodiment of the present invention. The content distributing system shown in FIG. 1 includes the on-board device 1, a service server 5, and a content server 7'. The on-board device 1 is installed in a vehicle 3 and has the content receiving and reproducing function. The service server 5 functions as a service provider providing content distributing service. The content server 7 functions as a content provider distributing content. The content distributing system is configured so that wireless communication is performed between the on-board device 1 and a base station 9. The service server 5, the content server 7, and the base station 9 are connected by a network 10. The service server 5 holds information related to content that can be distributed by the content server 7. The content server 7 distributes various contents, such as music, music introductions, advertisements, live sports coverage, variety, event guides, traffic information, advertisements, and time tone, as various data, such as text, still image, audio, and moving image. In the present specifications, a side to which the service server 5 and the content server 7 belong and that provides the content distributing service is referred to as a content distributing side. A side to which the on-board device 1 operated by a user belongs and that receives the content distributing server is referred to as the user side.

Figure 2:
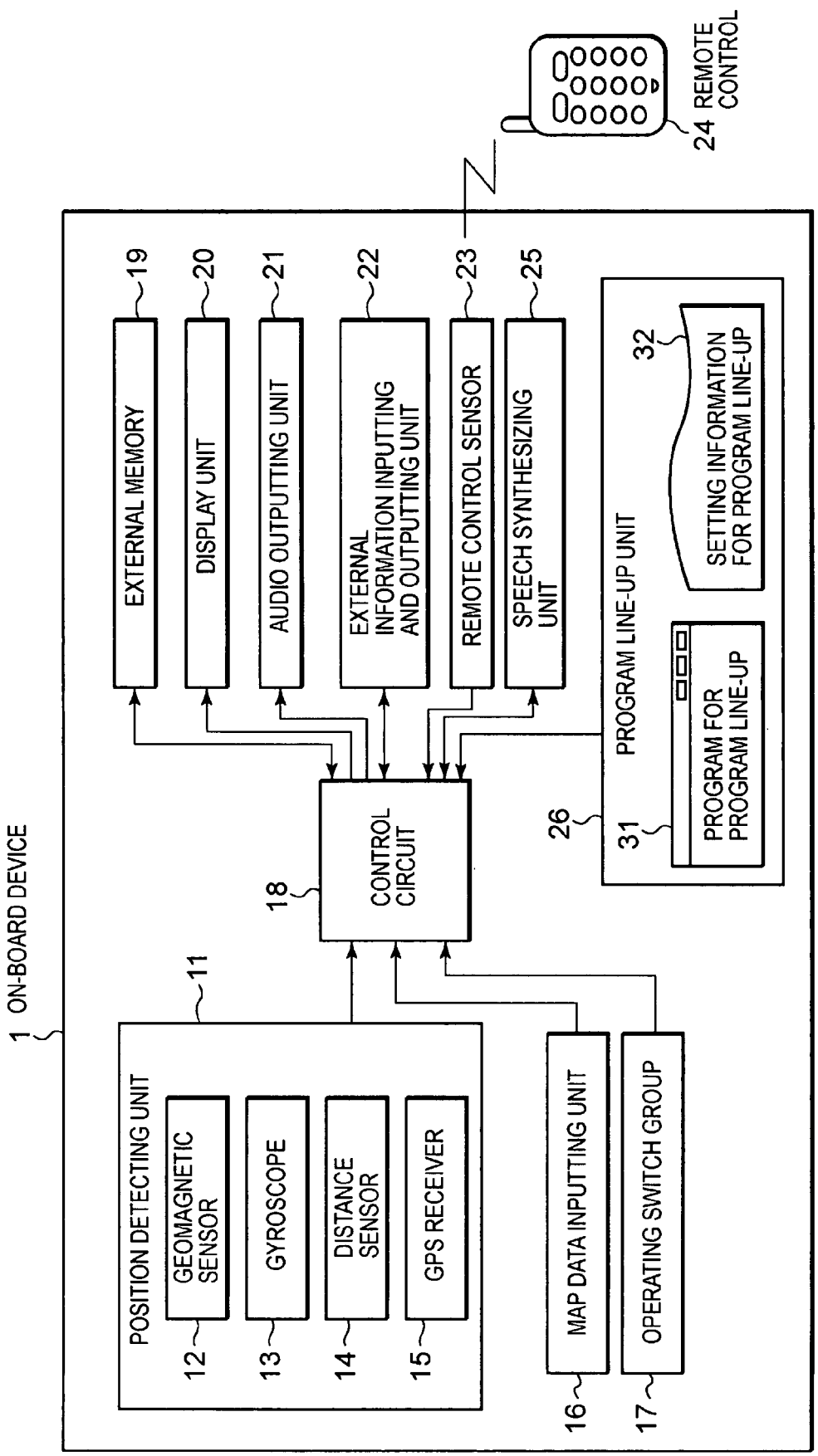
FIG. 2 is a block diagram of a configuration of an on-board device in the content distributing system according to an embodiment of the present invention.

Next, a configuration of the on-board device installed in the vehicle 3 will be described. FIG. 2 is a block diagram, of a configuration of the on-board device in the content distributing system according to the embodiment of the present invention. As shown in FIG. 2, the on-board device 1 includes a position detecting unit 11, a map data inputting unit 16, an operating switch group 17, a control circuit 18, an external memory 19, a display unit 20, an audio outputting unit 21, an external information inputting and outputting unit 22, a remote control sensor (remote control sensor) 23, a remote controller (remote control) 24, a speech synthesizing unit 25, and a program line-up unit 26. The position detecting unit 11 detects a current position of the vehicle 3. The map data inputting unit 16 acquires map data from a predetermined map data storing medium. The operating switch group 17 is touch-switches and mechanical switches allowing operation to be performed by the user. The control circuit 18 is connected to the position detecting unit 11, the map data inputting unit 16, and the operating switch group 17. The external memory 19 is connected to the control circuit 18. The display unit 20 is a liquid crystal display or the like visually displaying information. The audio outputting unit 21 is a speaker or the like. The external information inputting and outputting unit 22 performs connection and communication with an external network. The remote control sensor 23 and the remote controller 24 have the same function as the operating switch group 17 and allow operation to be performed by the user from a distant location. The control circuit 18 is configured by an ordinary computer. Although not shown in the diagram, a central processing unit (CPU), a read-only memory (ROM), a random-access memory (RAM), an input and output interface (I/O), and a bus line connecting each of these constituent elements are provided within the control circuit 18.

The position detecting unit 11 includes a geomagnetic sensor 12, a gyroscope 13, a distance sensor 14, and a global positioning system (GPS) receiver 15. The geomagnetic sensor 12 detects direction through geomagnetic detection. The gyroscope 13 detects an angle and a direction to perform position detection. The distance sensor 14 detects travel distance. The GPS receiver 15 detects a current position of the vehicle 3 based on radio waves from a GPS satellite. Each means for detection, 12 to 15, has an error differing in characteristics. Each measuring result by a plurality of sensors is configured to allow interpolation. Depending on accuracy, it is possible to use only some of the above-described means for detection, 12 to 15. Furthermore, a steering rotation sensor, a wheel sensor of each rolling wheel on the vehicle 3, and the like can be used.

The map data inputting unit 16 is used to acquire various data including so-called map-matching data for enhancing position detection accuracy, map data, facility index data, and landmark data. As a recording medium for recording the various data, a compact disc-read only memory (CD-ROM) and a digital versatile disc-read only memory (DVD-ROM) are used because of the amount of data. Recording media, such as a hard disk drive (HDD) and a memory card, can also be used.

The display unit 20 is, for example, a color-display liquid crystal display. On a display screen of the display unit 20, a vehicle current position mark, the map data, and additional data can be superimposed and the superimposed vehicle current position mark, map data, and additional data can be displayed. The vehicle current position mark is based on the current position provided by the position detecting unit 11. The map data is provided from the map data inputting unit 16. The additional data is a guidance route and the like displayed on the map. In addition, a route guidance function is provided in which, for example, by a navigation program stored with the map data being run by the control circuit 18, an optimal route, required time, and the like are calculated and displayed in the display unit 20 based on a destination inputted by the operating switch group 17 and the remote controller 24. The Dijkstra method and the like are used as a method for automatically setting the optical route such as this.

The external information inputting and outputting unit 22 is used to receive information provided by the network 10 and transmit the information to a communication device connected to the network 10. The network 10 is, for example, an infrastructure network, such as a vehicle information communication system (VICS), and the Internet. The control circuit 18 processes the information received via the network 10. The external information inputting and outputting unit 22 can also transmit the information processed by the control circuit 10 over the network 10, as required. The speech synthesizing unit 25 is used to convert the text data stored in the external memory 19 and the text data received from the network 10 to audio data and output the audio data from the audio outputting unit 21 as speech.

The program line-up unit 26 is a constituent element used to create a timetable (a program table) of the contents received from the network 10, based on user operations and various pieces of information. The program line-up unit 26 includes a program for program line-up 31 and setting information for program line-up 32. The program for program line-up 31 can be run by the control circuit 18. The setting information for program line-up 32 is used by the program for program line-up 31 during program line-up. The program for program line-up 31 is started when the user issues a request for receiving content from the content server 7 and reproducing the received content. The program for program line-up 31 is written to perform a process for deciding the timetable for the content to be received and reproduced, depending on various conditions, such as the preferences and situation of the user, a vehicle 3 state, road conditions, time, weather, and the like.

Figure 3:
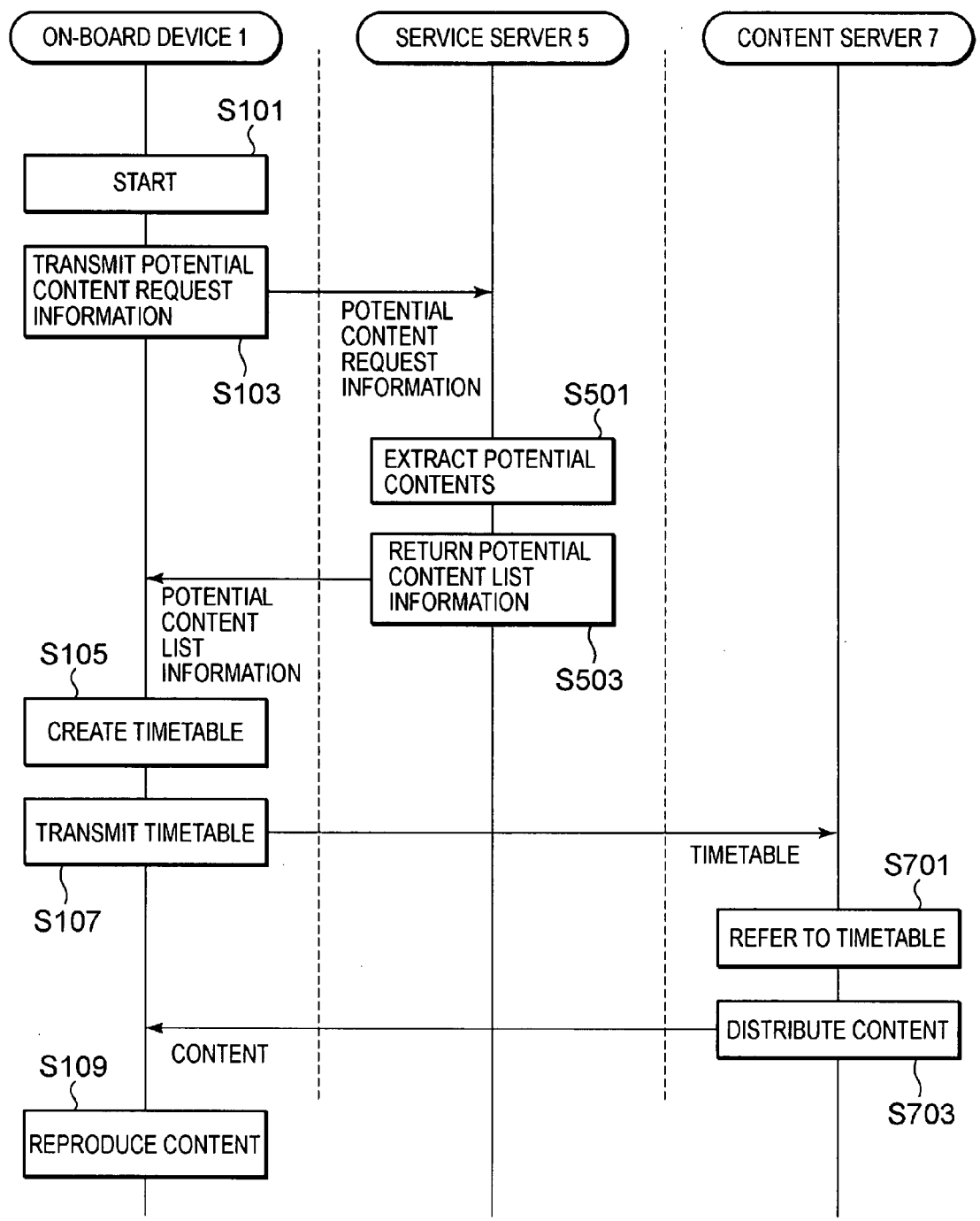
FIG. 3 is sequence chart of an overview of an example of an operation of the content distributing system according to an embodiment of the present invention.

Next, an overview of an operation of the content distributing system according to the embodiment of the present invention will be described. FIG. 3 is a sequence chart of an overview of an example of an operation of the content distributing system according to the embodiment of the present invention. First, the user gets in the vehicle 3, and turns to the ignition key to ON or starts the engine of the vehicle 3, thereby starting the on-board device 1 (Step S101: Start).

Here, when the user wishes for content distribution from the content server 7 and, for example, performs a predetermined content distribution request operation, such as pressing a start button assigned in the operating switch group 17, the on-board device 1 transmits potential content request information requesting a list of listenable contents to the service server 5, via the base station 9 and the network 10 (Step S103: Transmit potential content request information). At this time, identification (ID) information of the on-board device 1 used to identify the user side is simultaneously transmitted with the potential content request information.

Figure 4:
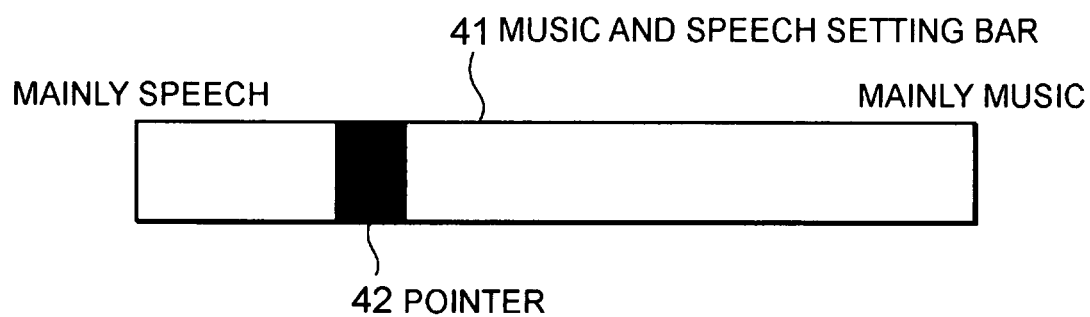
FIG. 4 is a schematic diagram of a music and speech setting bar displayed in a display unit of the on-board device according to the embodiment of the present invention.

During the content distribution request operation, for example, the user can be allowed to set a proportion between music and speech in the contents to which the user wishes to listen. FIG. 4 is a schematic diagram of an example of a music and speech setting bar displayed in the display unit of the on-board device according to the embodiment of the present invention. The music and speech setting bar 41 shown in FIG. 4 is configured so that a pointer 42 moves horizontally as a result of a predetermined button in the operating switch group 17 being pressed. Then, when the pointer 42 is moved to the left and a predetermined set button is pressed, the proportion of speech content in the overall contents increases. When the pointer 42 is moved to the right and the predetermined set button is pressed, the proportion of music content in the overall contents increases. As a result of a simple configuration such as this, the user can set the proportion between music and speech. Audio data reflecting the atmosphere within the vehicle and the current preference of the user can be reproduced.

At the same time, the service server 5 holds correspondence between the ID information of the on-board device 1 and preference information of the user of the on-board device 1 by performing a survey of the preferences and attributes (gender, age, address, family structure, and the like) of the user in advance and acquiring reactions from the user regarding previously distributed contents. When the potential content request information is received from the on-board device 1, a user type is decided with reference to the user preference information, and a plurality of potential contents are extracted depending on the type (Step S501: Extract potential contents). List information of the extracted plurality of potential contents is returned to the on-board device 1 (Step S503: Return potential content list information).

The potential content list information includes various pieces of information, such as the title of each content, the playing time of each content (the time from start to finish), and the genre of each content, in addition to identification information of the content that can be distributed from the content server 7. The potential content list information is not the contents themselves. In the description above, the service server 5 can create the potential content list information by sorting the contents depending on the user type, based on the preferences and the attributes of the user, thereby suppressing the data volume of the potential content list information.

However, content sorting based on the preferences and the attributes of the user can also be performed in the on-board device 1. Therefore, list information of all distributable contents of which there are a large number can be transmitted to the on-board device 1.

The on-board device 1 receives the potential content list information. The on-board device 1 sorts the contents to be actually distributed from among the contents described in the potential content list information and decides on a distribution order (an order in which the contents are reproduced in the on-board device 1), with reference to various conditions. The on-board device 1 creates a timetable based on the sorted optimal contents (Step S105: Create timetable). At this time, the on-board device 1 decides on a plurality of contents optimal for reception and reproduction, taking into consideration various conditions. The content sorting taking into consideration the various conditions will be described in detail hereafter. For example, optimal content sorting can be performed by contents stored in a predetermined music data recording medium (local content storing means) inserted into the external memory 19 in the on-board device 1, such as a CD and a hard disk storing music data, also being included. In addition, when the proportion between speech and music is set by the music and speech setting bar 41, the content sorting is performed depending on the proportion.

For example, the timetable is created so that the timetable is of a length of time matching the estimated required time to reach the destination (in other words, a timetable of which the total playing time of a plurality of contents matches the estimated required time to reach the destination). Therefore, a problem in which the user is formed to stop listening halfway through (halfway through the reproduction) when the destination is reached can be prevented.

For example, the timetable can be adjusted so that the distribution order of the contents can be determined depending on route information and text data can be received at a time at which the vehicle 3 is expected to pass through a location with a poor communication environment, such as a tunnel. Alternatively, the timetable can be adjusted so that music matching oceanic scenery can be received at a time at which the vehicle 3 is expected to travel on a road running along a shore. In addition, for example, to prevent simultaneous audio output of music and time tone that could annoy the user, the content to be reproduced when the time tone is outputted can be set to content other than music (such as an advertisement or news). Furthermore, regarding contents such as weather forecasts including regionally-based contents, the weather forecast for the current location of the vehicle 3 can be reproduced by the on-board device 1 transmitting estimated position information or the current location to the content server 7 during timetable transmission or during the reception of weather forecast content from the content server 7.

Then, the on-board device 1 transmits the timetable to the content server 7 with the content distribution request information (Step S107: Transmit timetable). The content server 7 refers to the timetable received from the on-board device 1 (Step S701: Refer to timetable) and performs a predetermined content distribution at a predetermined time set in the timetable (Step S703: Distribute timetable). The on-board device 1 performs streaming playback of the received content (Step S109: Reproduce content). In this way, the on-board device 1 creates the timetable allowing the reception and the reproduction of contents suitable for the various conditions on the user side. As a result, contents that do not bore the user can be reproduced, and the effort required of the user to sort the content himself is reduced. Furthermore, the user is not required to perform a content sorting operation during driving, thereby contributing, in particular, to safe driving of the vehicle 3.

When the on-board device 1 performs the streaming playback of the content is described above. However, because the content server 7 has acquired the timetable of the contents to be distributed, for example, the content server 7 can perform the content distribution slightly ahead of the time set in the timetable (look-ahead distribution). The content received by the on-board device 1 can be temporarily stored, and the temporarily stored content can be reproduced in accordance with the timetable. Regarding information such as news, for example, the content server 7 can perform distribution (text distribution) to the on-board device 1 using text data that has a smaller data volume compared to audio data. The speech synthesizing unit 25 in the on-board device 1 can convert the text data to audio data and perform audio output.

When the text data is converted to the audio data, the content of the text data can be converted into phrasing suitable for current conditions on the user side, conditions according to the environment on the user side, and the like. As a result, for example, depending on the number of passengers in the vehicle, when a plurality of passengers are present, the term "you" can be converted to "everyone". When information related to a local rainstorm and the like is transmitted, the direction from the current position of the vehicle can be used. The phrasing can be replaced to be easily understood by the user, such as "there is a rainstorm to the south" and "there is a rainstorm to the east".

When the user side receiving the content moves and the communication environment changes, the above-described look-ahead distribution and text distribution are particularly effective because stable content reproduction can be performed. For example, even when the communication between the on-board device 1 and the content server 7 is temporarily disconnected due to movement of the vehicle 3, an interruption to the content reproduction caused by communication disconnection does not occur because the on-board device 1 reproduces the content that has been received through look-ahead distribution and stored. When the content reproduction is interrupted due to communication disconnection, the reproduction of the contents stored in a predetermined music data recording medium in the on-board device 1 can be automatically performed. Even when the communication speed between the on-board device 1 and the base station 9 becomes slow, the transmission of text data having a small data volume can be performed without delay, and content reproduction can be performed without interruption.

In the sequence chart in FIG. 3, the creation of the timetable in the on-board device 1 and the transmission of the timetable to the content server 7 from the on-board device 1 are only performed once. However, for example, depending on changes in conditions accompanying the movement of the vehicle 3 and the passage of time (such as a change in destination and stops made en route, loading and unloading of passengers, driver change, and a change in the estimated required time due to accidents and traffic jams), the on-board device 1 can update the timetable and transmit the new timetable to the content server 7. In this case, the on-board device 1 can update the timetable based on the initially received potential content list information. Alternatively, the on-board device 1 can again receive the potential content list information from the service server 5 and create the timetable.

When paid content is sorted as the optimal content, the on-board device 1 preferably acquires permission from the user in advance to receive and reproduce the paid content, performs authentication of the user when the paid content is sorted, and the like. For example, a content distribution service management side can receive remuneration for advertisement distribution from an advertisement sponsor and reduce the communication charge and remuneration for content paid by the user as a result of the on-board device 1 always sorting advertised content during timetable creation, the content server 7 inserting advertisement information between contents to be distributed, and the like.

An embodiment in which the service server 5 and the content server 7 are present as separate servers is described above. However, the service server 5 and the content server 7 can be actualized by a single server. In addition, both functions of the service server 5 and the content server 7 can be actualized by, for example, a single server group (a group of a plurality of servers) provided within a predetermined center on the content distribution side. An embodiment in which the on-board device 1 receives the potential content list information from the service server 5 and acquires a list of contents that can be distributed from the content server 7 is described above. However, the on-board device 1 can hold the potential content list information in advance through settings made at the time of shipment of the on-board device 1 or by a CD-ROM or a DVD-Rom in the on-board device 1 being read. In this case, the service server 5 is not required to be provided. Each procedure at Step S103, Step S501, and Step S503 shown in FIG. 3 can be omitted.

In addition, the potential content list information and the content can be transmitted from the service server 5 and the content server 7 regardless of the potential content request from the on-board device 1 on the user side. As a result, the content distribution side can update the potential content list information held in the on-board device 1, write desired advertisement content in the potential content list information, and the like. In addition, desired content can be stored within the on-board device 1. When the timetable is created in the on-board device 1, the content that the content distribution side wishes to distribute can be made to be handled as one of the potential contents.

When the on-board device 1 creates the timetable, while the content distribution is being performed in adherence to the timetable, the service server 5 and the content server 7 can transmit the potential content distribution information and the content. As a result, the timetable can be recreated to include the content that the content distribution side wishes to distribute. Alternatively, content that should be distributed with urgency (for example, content related to news such as earthquake disaster information) can be preferentially distributed (forcibly reproduced).

Regarding billing of the paid content, the service server 5 that manages the ID information (namely, personal information of the user) of the on-board device 1 can manage and calculate the remuneration of the paid content. However, the content server 7 can be configured to manage the ID information (personal information of the user) of the on-board device 1 and manage and calculate the remuneration of the paid content. In addition, the content server 7 can be configured to manage and calculate the remuneration of the paid content by the service server 5 disclosing the ID information (personal information of the user) of the on-board device 1 to the content server 7.

According to the above-described embodiment, when the on-board device 1 transmits the timetable to the content server 7 and the content server 7 performs content distribution is described. However, the on-board device 1 can transit the timetable to the service server 5 and the service server 5 can manage the content distribution. In this case, the service server 5 holds all pieces of identifying information of the on-board device 1 (identifying information of the user side) and all pieces of identifying information of the content server 7. The service server 5 functions to mediate the content distribution service between the on-board device 1 and the content server 7. As a result of the service server 5 relaying the communication between the on-board device 1 and the content server 7, the on-board device 1 and the content server 7 can be made not directly visible to each other. The anonymity of the on-board device 1, the security of the content server 7, and the like can be enhanced.

Figure 6:
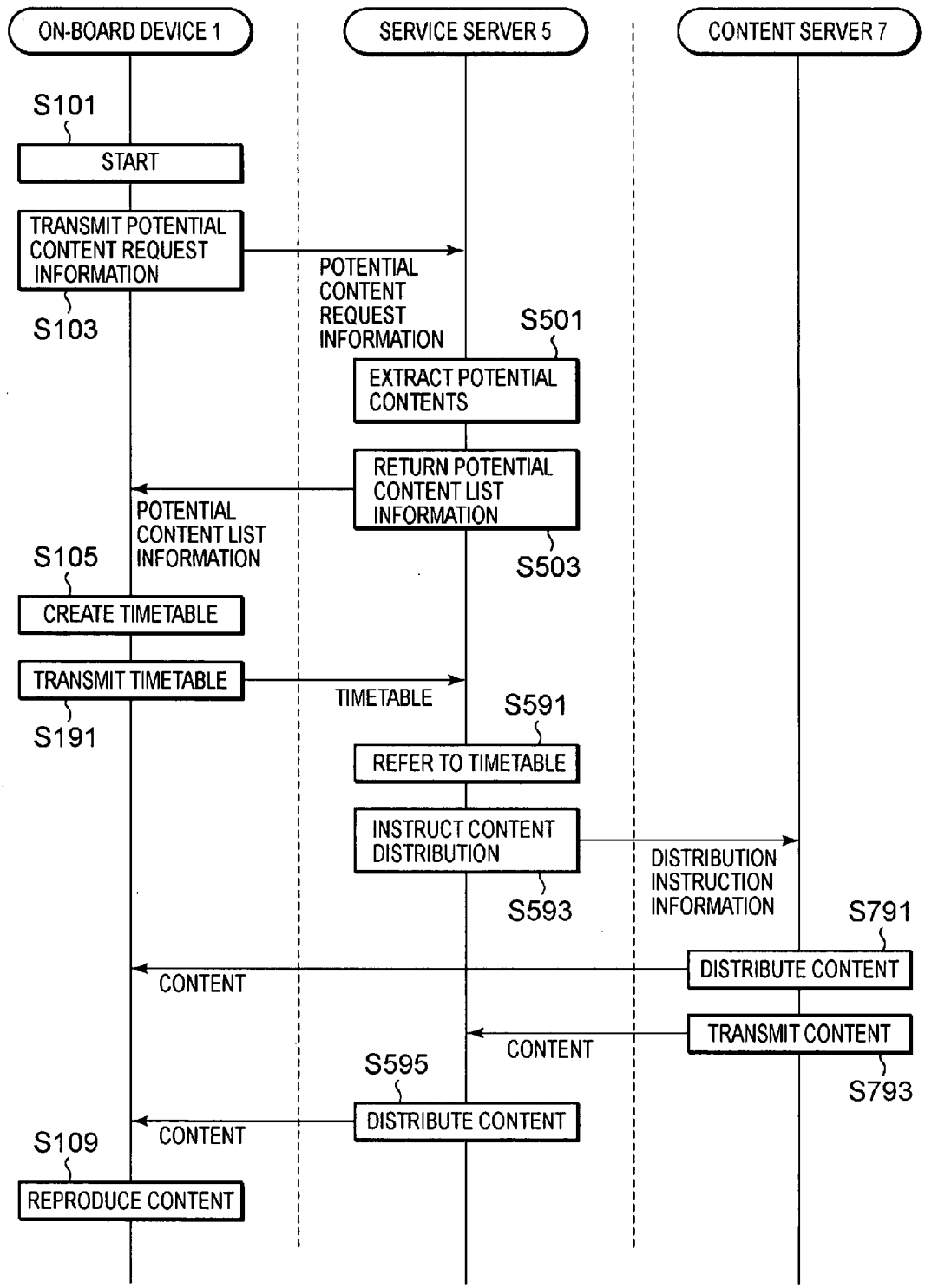
FIG. 6 is a sequence chart of an overview of an example of another operation of the content distributing system according to the embodiment of the present invention.

When the service server 5 manages the content distribution will be described hereafter. FIG. 6 is a sequence chart of an overview of another example of the operation of the content distributing system according to the embodiment. In the sequence chart shown in FIG. 6, each procedure from the start of the on-board device 1 (Step S101), the transmission of the potential content request information (Step S103), the extraction of the potential contents (Step S501), the return of the potential content list information (Step S503), to the creation of the timetable (Step S105) and the procedure of reproduction of the content (Step S109) are the same as the procedures in the sequence chart in FIG. 3. As described above, the procedures at Step S103, Step S501, and Step S503 can be omitted by the on-board device 1 holding the potential content list information in advance.

After the timetable is created, the on-board device 1 transmits the timetable to the service server 5 with the content distribution request information (Step S191: Transmit timetable). The service server 5 refers to the timetable received from the on-board device 1 (Step S591: Refer to timetable) and arranges the distribution of the predetermined content at the predetermined time set in the timetable. At this time, following three methods, for example, can be given as methods for distributing contents from the content distribution side.

In the first method, the service server 5 refers to the timetable (Step S591: Refer to timetable) and transmits distribution instruction information to the content server 7 instructing the content server 7 to distribute the content to the on-board device 1 (Step S593: Instruct content distribution). The content server 7 distributes the content to the on-board device 1 (Step S791: Distribute content).

In the first method, identification information of the content to be distributed, an address of the on-board device 1 to which the content is to be distributed, and the like are written in the distribution instruction information. Therefore, the content server 7 can directly transmit the predetermined content to the on-board device 1. The content is required to be distributed at a predetermined time. To actualize the content distribution at the predetermined time, the content distribution time can be written in the distribution instruction information and the content server 7 can distribute the content at the distribution time. Alternatively, the service server 5 can give the instruction for content distribution to the content server 7 at the content distribution time and arrange for the content server 7 to distribute the content at the distribution time.

In the second method, the service server 5 refers to the timetable (Step S591: Refer to timetable) and transmits the distribution instruction information to the content server 7 instructing the content server 7 to distribute the content to the on-board device 1 (Step S593: Instruct content distribution). The content server 7 distributes the content to the on-board device 1, via the service server 5 (Step S793: Transmit content; Step S595: Distribute content).

In the second method, the identifying information of the content to be distributed is written in the distribution instruction information. The content server 7 transmits the content to the service server 5. The service server 5 temporarily caches the content received from the content server 7. The cached content can be distributed to the on-board device 1 at the predetermined distribution time. The content received from the content server 7 can be transferred to the on-board device 1 through a simple process such as the identification information of the on-board device 1 (address of the on-board device 1) being changed to the transmission destination address. As a result, the anonymity of the on-board device 1, the security of the content server 7, and the like can be enhanced. In addition, centralized management of the content distribution service by the service server 5 is possible.

In the third method, when the content that is the same as the content cached within the service server 5 in the second method is requested from the user side, the service server 5 distributes the cached content to the on-board device 1 (Step S595: Distribute content). As a result, content-distribution load placed on the content server 7, traffic between the service server 5 and the content server 7, and the like can be reduced. In addition, because contents having high distribution frequency, new contents, and the like are preferentially cached, the service server 5 can efficiently cache the contents using limited resources.

The method in which the service server 5 manages the content distribution in this way is effective in a system in which a plurality of content servers 7 are dispersed and present in the network 10. For example, when the plurality of content servers 7, such as the content server 7 specializing in music distribution, the content server 7 specializing in news distribution, and the content server 7 specializing in advertisement distribution) are dispersed and present in the network 10, the service server 5 gives appropriate content distribution instructions to each content server 7. As a result, content distribution to the on-board device 1 in accordance with the timetable can be actualized.

Next, decisions regarding content sorting made at the time of timetable creation at Step S105 and taking into consideration various conditions will be described. In actuality, the content desired by the user side is decided based on various conditions that are complexly intertwined. In addition, the desired content is not necessarily decided as the only solution. In other words, when the content to be distributed to the user side is inferred by a computer, various conditions are required to be converted into numerical values. Which condition among the various conditions serves as a factor and what sort of dependency the factor has are required to be taken into account.

In this way, as a method for finding an optimal solution from various conditions including uncertain information, for example, a method of probabilistic analysis is effective. As the method of probabilistic analysis, there is a classic multivariate analysis method, a covariance structure analysis, a method using a decision tree, a neural network, a Bayesian network, and the like. Here, when the Bayesian network in particular is used in an inference network used to evaluate a probability of a representative variable that can take on a desired random variable (result) from an outcome of an observed variable (cause) will be described. In the Bayesian network, bi-directional calculations (deductive and recursive calculations) of the cause-and-effect relationship can be performed, and a belief-propagation algorithm integrating both calculations is established. The Bayesian network is effective when the inference network is dynamically changed.

Figure 5:
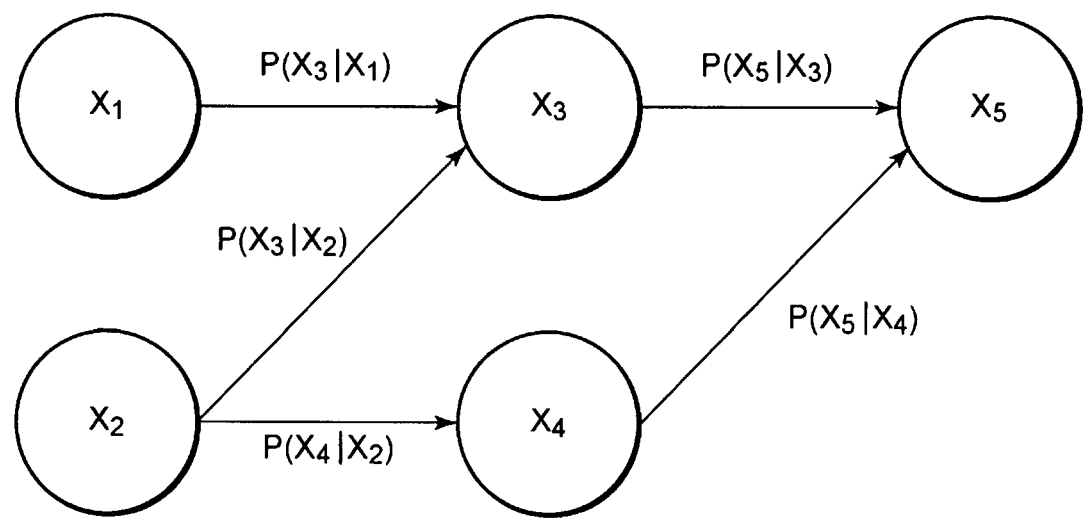
FIG. 5 is a schematic diagram for explaining an overview of a Bayesian network used as a probabilistic analysis algorithm of a program for program line-up shown in FIG. 2.

FIG. 5 is a schematic diagram for explaining an overview of the Bayesian network used as the probabilistic analysis algorithm of a program for program line-up shown in FIG. 2.

The Bayesian network is a model expressing qualitative dependencies of random variables in a graph structure and expressing a qualitative relationship between two random values (indicated by circles in FIG. 5) having dependency (indicated by links connecting the circles in FIG. 5) through conditional probability. For example, FIG. 5 shows a graph structure in which a random variable $X_1$ and a random variable $X_3$, a random variable $X_2$ and the random variable $X_3$, the random variable $X_2$ and a random variable $X_4$, the random variable $X_3$ and a random variable $X_5$, and the random variable $X_4$ and the random variable $X_5$ respectively have dependencies. In each dependency, between a random variable $X_j$ and a random variable $X_i$, a conditional probability $P(X_j|X_i)$ is set expressing a probability in which the random variable $X_j=\beta$ when the random variable $X_i=\alpha$.

In the Bayesian network, for example, when the random variable $X_1$ and the random variable $X_2$ are outcomes that can be inferred or observed, the probability of each representative variable that can take on the random variable $X_5$ is outputted after the calculation of the random variable $X_3$ and the random variable $X_4$, by the random variable $X_1$ and the random variable $X_2$ being inputted. In other words, the probability distribution of the random variable $X_5$ to be predicted can be acquired. The Bayesian network can also be followed in reverse. For example, when the random variable $X_5$ is decided, the probability distribution of the random variable $X_1$ and the random variable $X_2$ can be acquired through calculation of the random variable $X_3$ and the random variable $X_4$.

Next, the creation of the timetable using the Bayesian network according to the embodiment of the present invention will be described. Through the operation at Step S105 in FIG. 3, the on-board device 1 sorts the optimal contents and decides on the optimal distribution order, taking into consideration various conditions. Then, the on-board device 1 creates a timetable of the contents of which the distribution request is to be made. At this time, the process of the program for program line-up 31 is performed. The program for program line-up 31 is also application software to which the Bayesian network is applied.

The program for program line-up 31 is software for constructing a Bayesian network in which the quantitative and qualitative dependencies of a large number of input and output variables are set. The setting value of the conditional probability expressing the quantitative dependency is stored in the program line-up unit 26 as setting information for program line-up 32. The dependency and segregation relation of each random variable and the setting value of the conditional probability (the setting information for program line-up 32) are, for example, decided by learning based on data collected by the manufacturer side of the on-board device 1 and are set in the on-board device 1 in advance, at the time of shipping. As described hereafter, the setting value of the setting information for program line-up 32 can be updated depending on feedback from the user.

The Bayesian network sorts the optimal contents based on various conditions, such as conditions related to the vehicle 3 (user-side conditions), conditions related to the surrounding environment of the vehicle 3 (user-side environment-related conditions), conditions related to the user (user-side conditions), and conditions related to the contents. The Bayesian network converts the conditions into numerical values and performs calculation. For example, the Bayesian network is configured so that, by various pieces of information included in the conditions related to the contents being inputted into the Bayesian network, the respective probability distributions of the various pieces of information included in the conditions related to the vehicle 3 and the environment and the conditions related to the user can be acquired.

Then, by the various pieces of information included in the conditions related to each content written in the potential content list information being inputted into the Bayesian network, the respective probability distributions of the various pieces of information included in the conditions related to the vehicle 3 and the environment and the conditions related to the user is calculated. A judgment of equivalence between the calculation results and the values of the various pieces of information included in the actual conditions related to the vehicle 3 and the environment and conditions related to the user on the user side is performed by a filtering method. Contents are sequentially judged to be contents optimal for distribution, starting from the content having high equivalence.

The above-described various pieces of information including in the conditions related to the vehicle 3 and the environment are, for example, information on the vehicle type of the vehicle 3, information on the vehicle width of the vehicle 3, information on the displacement of the vehicle 3, information of the fuel specification of the vehicle 3, information on the operation condition of the vehicle 3, information on the breakdown condition of the vehicle 3, information on the breakdown and repair history of the vehicle 3, information on the maintenance of the vehicle 3, information on the speed of the car, information on the current position of the vehicle 3, information on the traveling direction of the vehicle 3, information on the vehicular gap, information on the destination set during route guidance, information on stops made en route, information on the route, information on the estimated time of arrival, attributes such as the number of passengers in the vehicle 3 and the gender and the age of the passenger, passenger information such as the relationship between the passenger and the driver of the vehicle 3, information on the road conditions, information on traffic jams, information on accidents, information on toll booths, information on public transportation vehicles such as bus services, information on emergency vehicles such as police cars and ambulances, information on the weather, information on communication conditions, and information on the current time.

The above-described various pieces of information included in the conditions related to the user are, for example, user attribute information, information on user preferences, and information related to the day-to-day actions of the user. The user attribute information are, for example, the date of birth, the gender, the blood type, the current address, the hometown, the academic history, the occupation, the job title, and the work location of the user. The information on user preferences are, for example, color preference, musical preference, scent preference, taste preference, song preference, musical artist preference, musical genre preference, book preference, author preference, book genre preference, television and radio program preference, average daily television viewing time, average daily radio listening time, food preference, and sensitivity to trends of the user. The information related to the day-to-day actions of the user are, for example, content reproduction history up until the present, main uses of the vehicle 3, feeling towards the vehicle 3, roads that the user dislikes, places which the user routinely visits, frequently used gas stations, and gas station card information.

The various pieces of information included in the conditions related to the content are, for example, information on the reproduction history of the content, information on the creation date of the content and the date of the most recent update, evaluation information including the general popularity and evaluation of the content, information on content remuneration, information on the playing time of the content, information on the data volume of the content, information on whether the content is in real-time, information on data type, and information on content details. The information on data type indicates data types such as text, still image, audio, and video. The information on content details is, for example, service types and selling points.

The above-described various pieces of information are one example. Information other than those above can also be used. Only some of the various pieces of information can be used as well. The above-described classification method is arbitrary and is not limiting. In other words, for example, the various pieces of information can be classified into dynamic information that changes in adherence to the movement of the vehicle 3 and the elapse of time and static information that is not dependent on the movement of the vehicle 3 and the elapse of time and does not change. Furthermore, the dynamic information can be classified into short-term dynamic information that suddenly changes over a short period of time and long-term dynamic information that gradually changes over a long period of time.

In addition, for example, user evaluation of the created timetable can be acquired through simple questions. Based on the user evaluation, the value of the conditional probability in a certain dependency or the values of the condition probabilities in all dependencies can be modified accordingly. As a result, autonomous learning is performed in the Bayesian network. Accuracy of the sorting of contents suitable for a situation in which various conditions are complexly intertwined can be enhanced.

Various pieces of information included in the conditions related to the vehicle 3 and the environment and the conditions related to the user, such as static information, can be stored in the on-board device 1 in advance by input from the user. The static information is, for example, information on user attributes and information on user preferences. Various pieces of information can be automatically collected in the on-board device 1, such as storing the location of frequently used gas stations and company name. Regarding dynamic information, such as information related to the destination, information on the speed of the vehicle, and information on traffic jams, the information can be collected via various sensors and various information acquiring means mounted onto the vehicle 3.

INDUSTRIAL APPLICABILITY

The present invention has an advantageous effect in that a program line-up related to contents distributed to the user side can be made depending on various conditions, preferences, communication environments, and the like of the user side that views and listens to the contents. The present invention is useful in content distribution services that can distribute contents to the user depending on the preferences of the user.

The invention claimed is:

1. A content receiving and reproducing device of a user side that receives content from a content distribution side and reproduces the received content, comprising:
   a potential content list information receiving or storing means that receives potential content list information from the content distribution side indicating contents that can be distributed from the content distribution side or that stores, in advance, potential content list information indicating contents that can be distributed from the content distribution side;
   a program line-up means that sorts the contents to be received and reproduced from the contents written in the received potential content list information and decides on a reproducing order of the contents, based on at least one of conditions of the user side, conditions related to an environment on the user side, and conditions related to the contents, and creates program table information;
   a program table information transmitting means that transmits the program table information created by the program line-up means to the content distribution side;
   a content receiving means that receives the contents distributed from the content distribution side in adherence to the program table information; and
   a content reproducing means that reproduces the content, when the program table information is created, the program line-up means refers to route information to a destination acquired from a route guidance function, infers a communication environment of a location that is predicted by the route information to be passed, and sorts the contents and decides the reproducing order depending on the inferred result so that a desired content is received at a time when the receiving and reproducing device is expected to pass through the location.

* * * * *